Oct. 13, 1959  L. A. RUNTON ET AL  2,908,532
BEARING FOR HELICOPTER ROTOR
Filed July 9, 1957  2 Sheets-Sheet 1

INVENTORS
LESLIE A. RUNTON
HENRY C. MORTON
BY
ATTORNEY

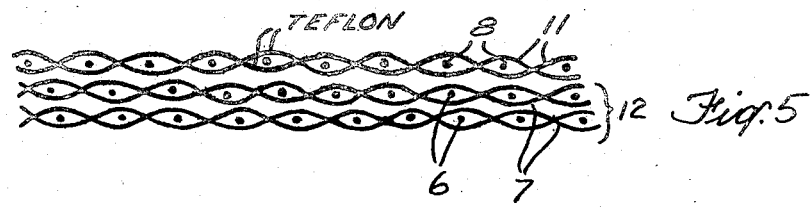
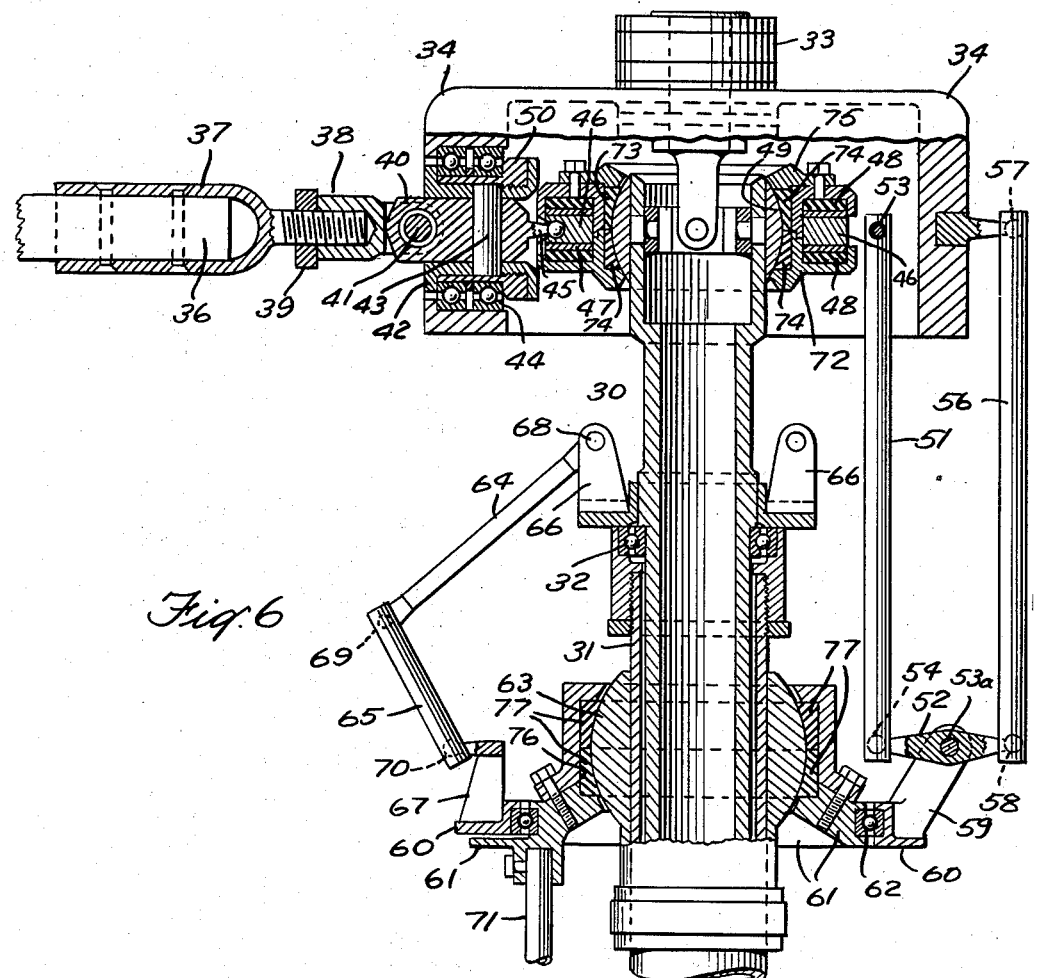

United States Patent Office 2,908,532
Patented Oct. 13, 1959

2,908,532

BEARING FOR HELICOPTER ROTOR

Leslie A. Runton, Middle Haddam, and Henry C. Morton, Branford, Conn., assignors to The Russell Manufacturing Company, Middletown, Conn., a corporation of Connecticut Application July 9, 1957, Serial No. 670,733

2 Claims. (Cl. 308—72)

This invention relates to bearings for helicopter rotors and more particularly to bearings for the universal joint by which the rotor hub is attached to the vertical drive shaft of a helicopter.

An object is to provide an improved oilless antifriction bearing for a coupling member of the above type.

Another object is to provide a helicopter rotor bearing having novel and improved characteristics.

Another object is to provide an oilless bearing ring for the azimuth ball seat of helicopter rotors.

Other objects and advantages will be apparent as the nature of the invention is more fully disclosed.

The nature of the invention will be better understood from the following description, taken in connection with the accompanying drawings in which a specific embodiment has been set forth for purposes of illustration.

In the drawings:

Fig. 5 is a detail view of the fabric plies showing the disposition of the Teflon yarn; and Fig. 6 is a detail view of a portion of a helicopter rotor illustrating the use of the bearing rings.

Figure 1:
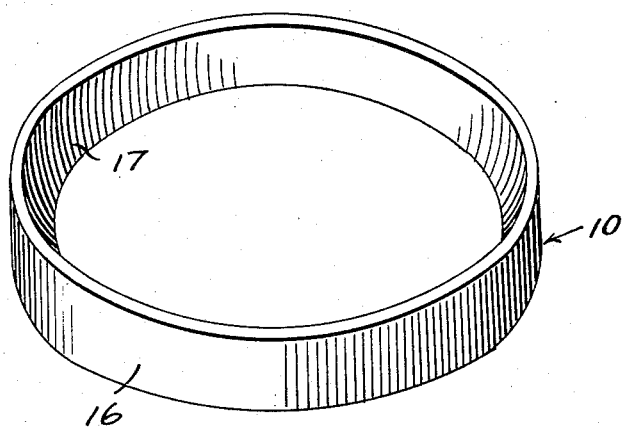
Fig. 1 is a perspective view of a bearing ring embodying the invention.
Figure 2:
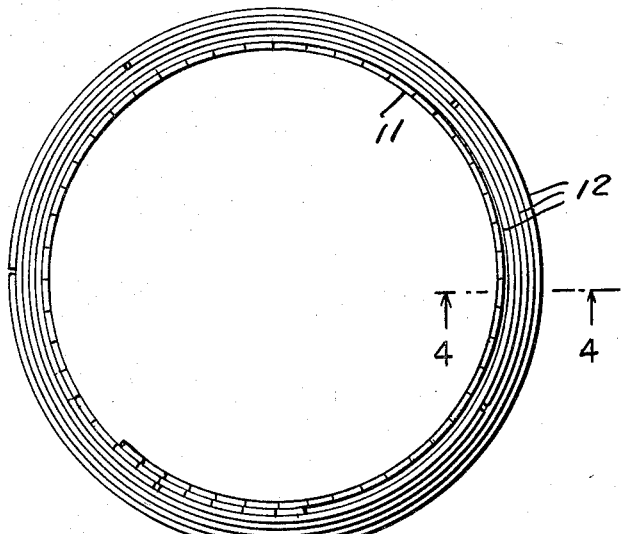
Fig. 2 is a plan view of the bearing ring before molding.
Figure 3:
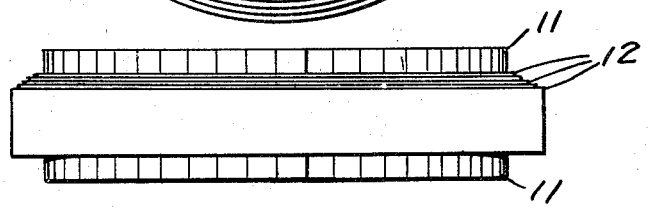
Fig. 3 is a side elevation of the bearing ring before molding.

Referring to the drawings more in detail the bearing ring 10 (Fig. 1) is composed of an inner ply 11 (Figs. 2 to 5) of woven fabric web having Teflon multifilament warp yarns 9 running circumferentially and filler yarns 8 composed of cotton, spun Dacron, nylon, Orlon, linen, jute, or the like, or other material capable of bonding to an impregnant. The web 11 may be composed of a section of a seamless tube or sleeve or a strip wound around a core cylindrical form.

At least two backing plies 12 of woven fabric, either in strip form or in the form of seamless tubes are disposed around the Teflon ply 11. The plies 12 may be composed of warp yarns 7 and filler yarns 6 or the same material as filler yarns 8 above noted. If the plies 11 and 12 are composed of strip material the joints are staggered for strength.

The ply 11 may be of a single or multiple ply construction and contain varying amounts of Teflon yarn from 15% to 100% on the operating surface. The laminated fabric may be impregnated with a high strength phenolic bonding resin derived from the reaction product of phenol, cresol or a homologue with formaldehyde under controlled conditions.

Figure 4:
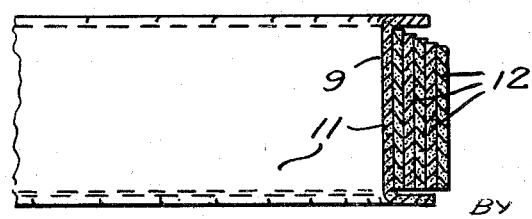
Fig. 4 is an enlarged fragmentary section taken on the line 4—4 of Fig. 2 showing the inner ply folded over as in the initial step of molding.

The various plies 11 and 12 may be selected to conform generally to the shape of the finished product so as to facilitate the molding operation. The inner ply 11 is shown as extending above and below the outer plies 12 so as to insure that the inner ply will cover the entire inner surface of the ring and to compensate for any displacement that might take place during the molding operation. During molding the projecting edges of the inner ply tend to fold outwardly over the outer plies 12 as shown in Fig. 4 which further secures the inner ply in place.

The plied fabric is first impregnated with the uncured bonding resin as above described. The treated base is carefully heated to remove the solvent and the resin content polymerized until a residual volatile content of 5% to 7% is attained.

After assembly of the treated fabric into a preform, the impregnated ring is placed in a mold and molded under heat and pressure into the desired finished form (as shown in Fig. 1). The conversion of the resin into a thermoset form may be accomplished at a temperature of 300° F. to 350° F. for from thirty to sixty minutes at pressures of 10 tons to 100 tons depending upon the area of the object being molded.

The finished bearing ring 10 is shown in Fig. 1 as having a cylindrical outer surface 16 and a segmental spherical inner surface 17. Other contours may be formed according to the end use of the bearing.

The bonding resin is not capable of bonding to the Teflon yarn. However, it bonds to the filler yarns 8 and to the yarns 6 and 7 of the inner plies to form a rigidly bonded unit wherein the Teflon is held in place mechanically.

Since the Teflon yarn is held in position both mechanically and by bonding, it will not deform or "creep" under heavy pressures thus greatly extending the useful life of the bearing ring. In addition the Teflon yarn, being chemically inert, remains unchanged in composition under severe adverse conditions of operation.

For low temperature applications the yarns 6, 7 and 8 may be composed of cotton or the like for economy. For high temperature applications these yarns may be composed of spun Dacron, which is capable of withstanding relatively high temperatures. Nylon, Orlon, or the like, may be used in applications wherein a high tensile strength is required or where their other characteristics render them particularly suitable.

Bearing rings of this character are especially adapted for use as oilless antifriction bearings for the azimuth ball seats of helicopter rotors such as shown in the patent to Stanley No. 2,440,070.

As shown in Fig. 6 this mechanism comprises a hub spindle 30 which is driven through suitable means (not shown) and is mounted in a fixed non-rotative sleeve 31 by means of a bearing 32.

A spindle extension 33 on which the rotative hub 34 is mounted is connected to the upper end of the spindle 30 by a universal joint 35, commonly referred to as the azimuth ball seat. The hub 34 carries three blades, the inner end of one of which is shown at 36. The blade 36 is provided with a root end mounting member 37 the inner end of which is threaded into a block 38 and secured by a nut 39. One end of a link 40 is secured to the forked inner end of the block 38 by a flapping pivot 41, thereby providing freedom for blade swinging movement in a direction generally transverse to the mean rotative path of travel of the blades.

The link 40 projects into a sleeve 42 and is connected thereto by a drag pivot 43 thereby providing freedom for lag-lead movement of the blade.

The sleeve 42 is rotatably mounted in the hub 34 by bearing 44 the axis of which is coincident with the longitudinal axis of the blade, thereby providing for pitch change movement of the blade.

The lag-lead movement of the blades may be controlled by means of a damper device which is concentrically arranged within the hub. Each blade is provided with an inwardly projecting arm 45 which cooperates with a ring segment 46. The several segments 46 are mounted in a cage 72 in spaced relation to each other. Above and below the segments friction discs 47 are backed by rubber rings 48 so as to restrain movement of the segments about the hub. The movements of the blades in the lag-lead sense are thereby damped or restrained.

Since the hub is free to float about the center point of the universal 35, the damper device described above is also mounted for similar floating movement, a spherical seat 49 being provided on which the cage 72 is mounted. Preferably the damper device is free to rotate with respect to the hub spindle 30, the effect of which is to permit unrestrained lag-lead movement of the blades in the same sense. Relative lag-lead movement of the blades (for instance, one forwardly and another rearwardly) is, however, restrained by the action of the damper device.

For the purpose of controlling the pitch angle thereof, each blade is provided with an arm 50 which is rigidly connected to the sleeve 42 and therefore may be used to rotate the blade about its longitudinal axis. A vertical link 51 interconnects the control arm 50 and one end of a lever 52. Ball and socket joints 53 and 54 are provided at the upper and lower ends of the link 51. The lever 52 is pivoted intermediate its ends, as indicated at 53a, the other end of the lever being connected to the hub 34 by a link 56, ball and socket joints 57 and 58 being provided in this link connection.

The lever 52 is mounted on a bracket 59 carried by a rotative ring 60, it being understood that the linkage above described (50 to 59 inclusive) is duplicated for each blade. The ring 60 is rotatably mounted on a swash member 61 by means of a bearing 62, the swash member 61 being tiltable in all directions on a ball 63.

The ring 60 is constrained to rotate with the rotor by a "scissors" linkage including link parts 64 and 65, the upper member 64 of which is pivoted to a bracket 66 carried by and rotating with the spindle 30. The lower end of the link 65 is connected to a bracket 67 carried by the ring 60. The joints 68, 69 and 70 in this linkage are such as to constrain the ring 60 to rotate with the rotor and yet to permit freedom for tilting movement of the ring 60 about the center of the ball 63, by means of a control tube 71 which is secured to the swash member 61 and extends downwardly therefrom.

During operation there is considerable wear between the cage 72 and the spherical seat 49, and between swash member 61 and the ball 63, due to friction. In order to minimize this wear an annular recess 73 is provided in the cage 72 in which a pair of similar ring-shaped bushings 74 are secured by a cap 75. An annular recess 76 is provided in the swash member 61 in which a pair of bushings 77 are mounted, similar to the bushings 74.

The detailed construction of a rotor of the above type is more fully set forth in the patent to Stanley above mentioned and only so much has been described herein as is necessary to an understanding of the present invention.

Also it is to be understood that the invention is applicable to the corresponding ball seats of any comparable type of helicopter rotor and is not to be restricted to the specific construction herein described.

What is claimed is:

1. A molded fabric antifriction bearing ring having an inner bearing surface, said bearing comprising a plurality of separate tubular plies of woven fabric concentrically arranged and joined together solely by a bonding resin, the plies comprising an inner ply and at least two outer plies, said inner ply extending axially beyond said outer plies and being folded thereover at both ends so as to form the entire exposed inner surface and at least a portion of the end surfaces of said ring, said inner ply comprising multifilament Teflon warp yarns extending circumferentially and filler yarns of a resin bondable material woven with said warp yarns, the outer plies being composed of woven yarns of a resin-bondable material and a heat set and secured bonding resin impregnating said plies and bonding said plies into the form of a rigid molded ring with said multifilament Teflon yarns exposed to constitute the inner bearing surface.

2. A helicopter azimuth ball seat comprising an inner seat member having a spherical surface and an outer member having an inner cylindrical surface and a bearing ring bonded to said cylindrical surface and having an inner spherical surface engaging said first spherical surface to form a bearing therefor, said bearing ring comprising a plurality of separate tubular plies of woven fabric concentrically arranged and joined together solely by a bonding resin, the plies comprising an inner ply and at least two outer plies, said inner ply extending axially beyond said outer plies and being folded thereover at both ends so as to form the entire exposed inner surface and at least a portion of the end surfaces of said ring, said inner ply comprising multi-filament Teflon warp yarns extending circumferentially and filler yarns of a resin bondable material woven with said warp yarns, the outer plies being composed of woven yarns of a resin bondable material and a heat set and cured bonding resin impregnating said plies and bonding said plies into the form of a rigid molded ring with said multi-filament Teflon yarns exposed to constitute the inner bearing surface.

References Cited in the file of this patent

UNITED STATES PATENTS 2,804,886     White _____ Sept. 3, 1957